United States Patent [19]
Planells Almerich et al.

[11] Patent Number: 5,637,983
[45] Date of Patent: Jun. 10, 1997

[54] CHARGER FOR ELECTRIC ACCUMULATORS

[75] Inventors: Francisco Planells Almerich, Valencia; Salvador Borja Baixauli, Torrente, both of Spain

[73] Assignee: Cargadores Pla-Bor Sociedad Limitada, Torrente, Spain

[21] Appl. No.: 513,898

[22] PCT Filed: Jan. 4, 1995

[86] PCT No.: PCT/ES95/00002

§ 371 Date: Sep. 7, 1995

§ 102(e) Date: Sep. 7, 1995

[87] PCT Pub. No.: WO95/19061

PCT Pub. Date: Jul. 13, 1995

[30] Foreign Application Priority Data

Jan. 7, 1994 [ES] Spain ..................................... 9400027

[51] Int. Cl.⁶ .................................................. H02J 7/10
[52] U.S. Cl. ........................... 320/57; 320/59; 320/DIG. 2
[58] Field of Search .................................. 320/39, 57, 58, 320/59, DIG. 2; 363/53

[56] References Cited

U.S. PATENT DOCUMENTS

| | | | |
|---|---|---|---|
| 3,848,173 | 11/1974 | Hase | 320/39 |
| 4,311,952 | 1/1982 | Mabuchi et al. | 320/57 X |
| 4,460,863 | 7/1984 | Conforti | 320/59 |
| 4,621,225 | 11/1986 | Birk | 320/59 |

*Primary Examiner*—Peter S. Wong
*Assistant Examiner*—Patrick B. Law
*Attorney, Agent, or Firm*—Richard M. Goldberg

[57] ABSTRACT

The charger comprises a circuit which includes a reactance before or after a transformer and includes a rectifier, a pull-off and/or an equalizer, formed of at least one diode/rectifier assembly, being provided between both branches of the circuit; the pull-off circuit may be substituted by a switch-off circuit to cut off the charging when the accumulator is carged. The charge is produced by voltage drop by voltage differential maintaining the amperage.

21 Claims, 1 Drawing Sheet

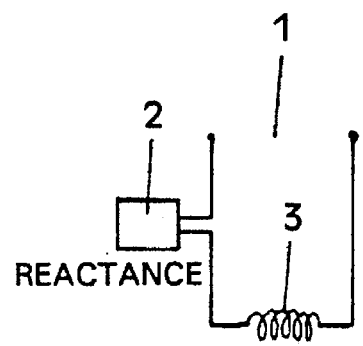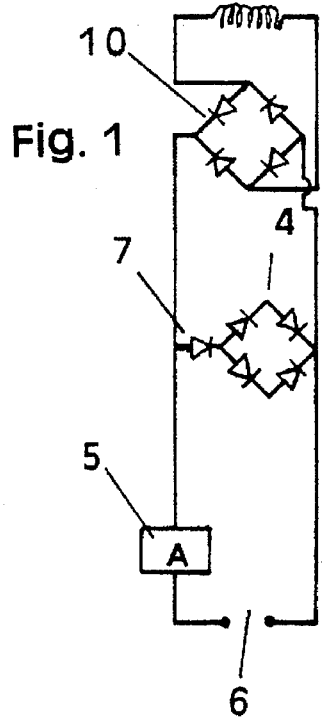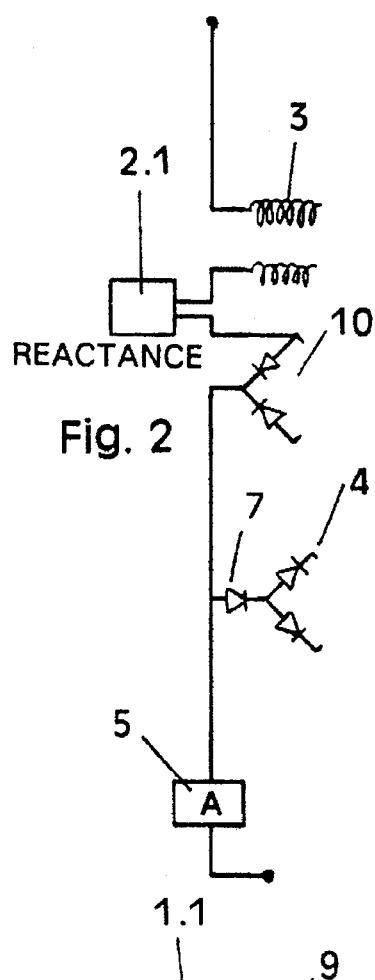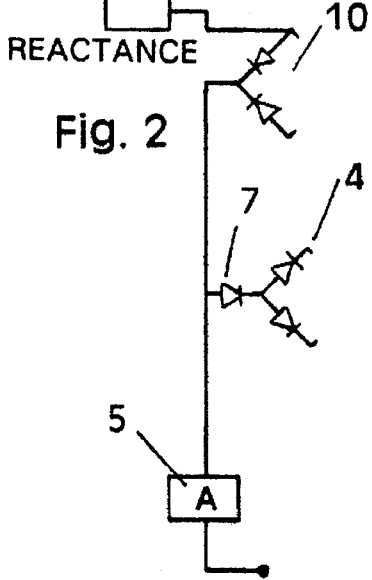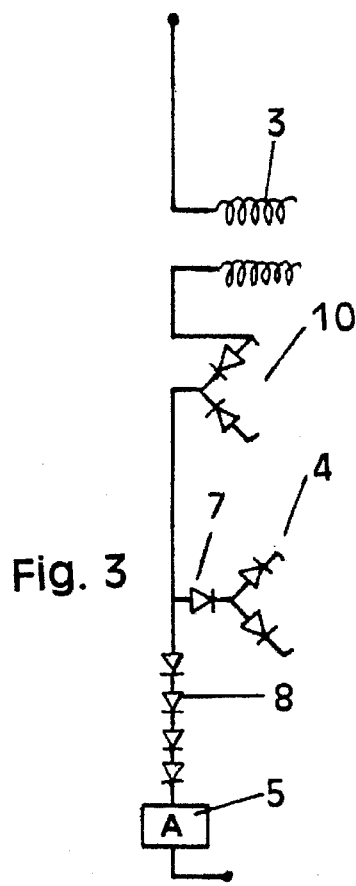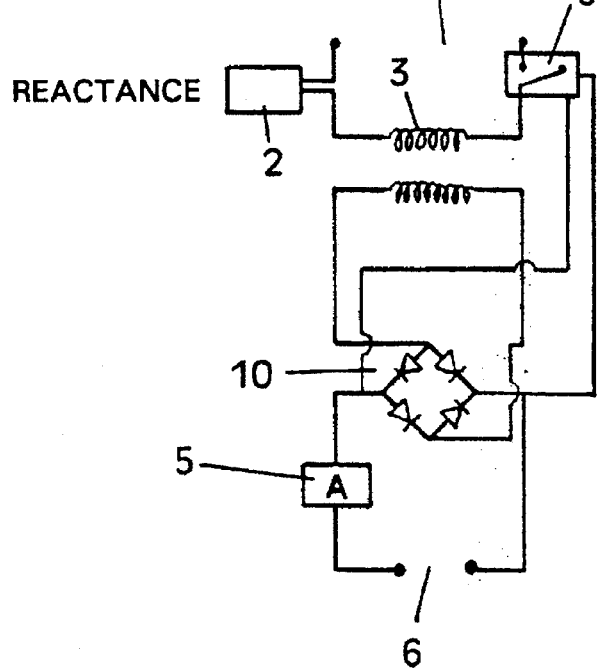

CHARGER FOR ELECTRIC ACCUMULATORS

BACKGROUND OF THE INVENTION

The sector involved in this parent's technique is that of chargers for electrical accumulators or batteries of the sort that are known as rechargeable as well as the non-rechargeable ones, which accept and keep the recharge by means of this type of charger.

ES P9101267 for a circuit and device for recharging accumulators or batteries and other specific use, by the same applicants as this present one, is made up of a circuit which uses direct current to provide for consumption on one part of the circuit and a charging terminal. The content of this patent was extended with the same essence by PCT ES9200044.

U.S. Pat. No. 3,391,321 for a battery (cell) charger in series consists of a battery holder box linked to a circuit in series, having a resistance and a diode on one branch of the circuit, an operation pilot light and a switch.

DE D9100421 for an electrical device with a direct current low frequency motor, consists of a circuit with two alternative branches connected to one of the poles, provided with a resistance, alternative switch and rectifier.

DE A3810397 for a current supplier for a device is, characterized by having a circuit made up of an external branch connected in series to batteries and an internal circuit provided with diodes in one or two directions.

SUMMARY OF THE INVENTION

The aim of this invention is a charger of electrical accumulators which produces a flow of input current of greater voltage than the rated output voltage of the battery, being provided with a circuit which determines regulation of the charge, in accordance with the specific use involved, for batteries of any kind.

A traditional battery charger carries out the charging process by providing a flow of current of stable voltage and a amperage that goes down in accordance with said battery's level of charge. The charging system proposed by this patent carries out the charging process by providing a flow of current whose voltage is higher than that of the battery to be charged and which regulates the amperage.

In the case of small electrical batteries of the kind considered not rechargeable, for example the button type ones, traditional chargers give rise to an explosion, which does not occur with this one, through its own particular system.

It is well-known that at present a 6 V battery is charged with a charger whose output transformer is 6 V; a 12 V one with a charger whose output transformer is 12 V and the 24 V ones with a charger whose transformer output is 24 V and so on according to each voltage in the corresponding way.

This charger consists of a circuit in which the transformer's output voltage is greater than the voltage of the battery to be charged, for example from 5 to 10 volts greater than the voltage of the battery to be charged, and from the battery voltage, the increase in this voltage brings about a great reduction in the charging time, with this increase being optimum from 10 volts, producing a constant charge, stemming from the voltage drop arising from inserting a circuit, either before the transformer or after this, such as for example one or more reactances, a transformer, a set of diodes, a resistance, whose consumption will be in accordance and in relation with the voltage and amperage of the transformer.

This system also carries out its functions because it works in a different way to the traditional type of chargers known today in the following cause-effect system:

A conventional charger which is connected to a more or less discharged battery marks a current input of 10 A. If another charger is connected to the same battery, with the same characteristics, the latter will not give a 10A input reading as the first did, but both will considerably lower the input of current to the battery, by spreading the load of the first between the two, with a minimum increase of the initial 10A.

Using the system proposed in this patent, in the aforementioned case the two would charge at 10 A so that between the two the current input would be 20 A, which is the sum of the 10 A plus the 10 A contributed by each charger of the same characteristics which is connected to the battery, as if we were to connect up to a battery a 7 A charger to which two 10 A ones had already been connected, the sum would be 27 A with an oscillation of from ±1 and 3 A through losses not to do with the charging system.

After charging the battery the input current is cut by means of a relay, kit, meter or other technically available means.

The principle on which this loading system is based stems from the possibility of producing an input charge which during the charging process linearly provides all the power that the accumulator is capable of absorbing, in accordance with the corresponding circuit. This means that the electric power supplied does not decrease in accordance with the state of charge and for this reason it is absolutely efficient and gives a full charge to the accumulators.

The small battery charging system is carried out in the same way and under the same principles; the voltage drop through voltage differential. The difference between both lies in the fact that for small batteries, the pulloff or equalizing cutout system for the charging current works by means of rectifiers and diodes. In these circuits, when the battery has been charged, the current is deviated through the rectifiers and diodes, and therefore does not overload the batteries to be charged.

BRIEF DESCRIPTION OF THE DRAWINGS

In order to make the following explanation clearer, a sheet of drawings which represents the essence of this invention is included.

FIG. 1 gives an example of the full circuit.

FIG. 2 shows a pole of said circuit in accordance with one possible embodiment.

FIG. 3 shows a pole of said circuit in a third embodiment.

FIG. 4 shows a second example of a full circuit.

DESCRIPTION OF THE PREFERRED EMBODIMENTS

In FIG. 1 number 1 shows the voltage input to the circuit, and 2 is a reactance provided before a transformer 3. The pulloff or equalizing circuit for the charging current is formed of at least one diode bridge or rectifier shown as 4, preceded by at least one diode 7, and without being inherent to the system, but merely a means of control, there is an ammeter 5 before the output charge terminals shown as 6. The rectifier, whether just one or several in series, is shown as 10.

FIG. 2, unlike the embodiment in FIG. 1, has the reactance in the transformed current circuit and is shown as 2.1;

this has the advantage that the reactance of a low voltage current requires less spiral thickness, and is thus lighter.

As compared to the two previous ones, FIG. 3 differs in that in the same type of circuit, the reactance has been replaced by a set of diodes in series shown as 8.

The circuit described above, in any of its variants, carried out the charging process, preferably of small accumulators. Its principle is based on the fact that the current which is output through terminals 6 is rejected by the accumulator when this is charged and in these conditions it is absorbed through the equalizing circuit; on one side by the reactance, by the diode bridge and by the diodes in series in the case of FIG. 3 determining an absorption of the power that does not reach the last part of the circuit if the accumulator is full.

FIG. 4 shows a circuit that is essentially similar to the previous one, whose application is for more powerful accumulators, with one part of a circuit being for the absorption of power that is no longer taken to the accumulator, a cutout circuit working through the state of the charge.

In said FIG. 1.1. represents the input of voltage coming from either the mains, or from an alternator or dynamo. 2 shows the reactance which can occupy the same position as reactance 2 in FIG. 1 and possibly be made up of a set of diodes in series such as the ones shown as 8. The cutout circuit 9 is placed on the rectified current circuit and thus detects the voltage of the battery, at whose predetermined limit it cuts off the supply from the mains. Circuit 9 is schematically shown as a switch, merely for ease of understanding. The equalizing circuit 4, 7 and the cut-off circuit 9 are both overcharging prevention circuits which function to prevent overcharging of the accumulator after the accumulator has been charged.

Explanation of one form of embodiment:

With a 220 V input and 24 V output 720 W transformer, inserting a 220 V 400 W reactance between mains and transformer there is a voltage drop which produces the input of constant current of 24 A/h in a 12 volt 55 A/h battery, so that theoretically the battery is totally charged in 137 minutes, starting from a completely discharged battery.

With a 220 V input and 24 V output and 480 W transformer, inserting a 250 W reactance between mains and transformer means there is a voltage drop which produces the input of constant current of 15 A/h in a 12 volt battery and 55 A/h, so that theoretically the battery is totally charged in 220 minutes, starting from a completely discharged battery. By referring to a 250 W reactance, this means that the reactance is rated for a certain power level, for example, 250 W.

This is applicable in the industry manufacturing battery chargers of any voltage and amperage, and for recharging electrically driven car batteries and electrical machinery.

We claim:

1. A charger for electrical accumulators, comprising:
   input terminals for receiving an input signal;
   output terminals for producing an output signal;
   a transformer connected to the input terminals for producing an alternating current output signal at a voltage greater than a rated voltage of said accumulator to be charged, said transformer producing said alternating current output signal in response to the input signal;
   rectifier means for rectifying the alternating current output signal from said transformer to produce a direct current output signal and for supplying said direct current output signal to said output terminals;
   circuit means for regulating said output signal of said charger by producing a voltage drop of said input signal while ensuring that a substantially constant amperage is produced by said charger, said circuit means including a reactance connected between said transformer and said input terminals; and
   overcharging prevention circuit means for preventing overcharging of said accumulator after the accumulator has been charged, said overcharging prevention circuit means being connected in parallel with said rectifier means.

2. A charger according to claim 1, wherein said input signal is an alternating current signal.

3. A charger according to claim 1, further comprising an ammeter connected to said output terminals for measuring the current of said output signal.

4. A charger according to claim 1, wherein said overcharging prevention circuit means includes an equalizing circuit connected to said rectifier means for absorbing current after the accumulator has been charged.

5. A charger according to claim 4, wherein said equalizing circuit includes a series circuit of at least one diode and a diode bridge, with said series circuit connected in parallel with said rectifier means.

6. A charger according to claim 1, wherein said overcharging prevention circuit means includes a switch-off circuit connected to said input terminals for cutting off power to said accumulator after said accumulator has been charged.

7. A charger according to claim 1, wherein the output signal has a voltage level which is in the range of approximately 5 to 10 volts greater than the rated voltage of the accumulator.

8. A charger for electrical accumulators, comprising:
   input terminals for receiving an input signal;
   output terminals for producing an output signal;
   a transformer connected to the input terminals for producing an alternating current output signal at a voltage greater than a rated voltage of said accumulator to be charged, said transformer producing said alternating current output signal in response to the input signal;
   rectifier means for rectifying the alternating current output signal from said transformer to produce a direct current output signal and for supplying said direct current output signal to said output terminals;
   circuit means for regulating said output signal of said charger by producing a voltage drop of said input signal while ensuring that a substantially constant amperage is produced by said charger, said circuit means including a reactance connected between said transformer and said rectifier means; and
   overcharging prevention circuit means for preventing overcharging of said accumulator after the accumulator has been charged, said overcharging prevention circuit means being connected in parallel with said rectifier means.

9. A charger according to claim 8, wherein said input signal is an alternating current signal.

10. A charger according to claim 8, further comprising an ammeter connected to said output terminals for measuring the current of said output signal.

11. A charger according to claim 8, wherein said overcharging prevention circuit means includes an equalizing circuit connected to said rectifier means for absorbing current after the accumulator has been charged.

12. A charger according to claim 11, wherein said equalizing circuit includes a series circuit of at least one diode and a diode bridge, with said series circuit connected in parallel with said rectifier means.

13. A charger according to claim 8, wherein said overcharging prevention circuit means includes a switch-off circuit connected to said input terminals for cutting off power to said accumulator after said accumulator has been charged.

14. A charger according to claim 8, wherein the output signal has a voltage level which is in the range of approximately 5 to 10 volts greater than the rated voltage of the accumulator.

15. A charger for electrical accumulators, comprising:

input terminals for receiving an input signal;

output terminals for producing an output signal;

a transformer connected to the input terminals for producing an alternating current output signal at a voltage greater than a rated voltage of said accumulator to be charged, said transformer producing said alternating current output signal in response to the input signal;

rectifier means for rectifying the alternating current output signal from said transformer to produce a direct current output signal and for supplying said direct current output signal to said output terminals;

circuit means for regulating said output signal of said charger by producing a voltage drop of said input signal while ensuring that a substantially constant amperage is produced by said charger, said circuit means including a plurality of series connected diodes connected between said rectifier means and said output terminals; and overcharging prevention circuit means for preventing overcharging of said accumulator after the accumulator has been charged, said overcharging prevention circuit means being connected in parallel with said rectifier means and said circuit means.

16. A charger according to claim 15, wherein said input signal is an alternating current signal.

17. A charger according to claim 15, further comprising an ammeter connected to said output terminals for measuring the current of said output signal.

18. A charger according to claim 15, wherein said overcharging prevention circuit means includes an equalizing circuit connected to said rectifier means for absorbing current after the accumulator has been charged.

19. A charger according to claim 18, wherein said equalizing circuit includes a series circuit of at least one diode and a diode bridge, with said series circuit connected in parallel with said rectifier means.

20. A charger according to claim 15, wherein said overcharging prevention circuit means includes a switch-off circuit connected to said input terminals for cutting off power to said accumulator after said accumulator has been charged.

21. A charger according to claim 15, wherein the output signal has a voltage level which is in the range of approximately 5 to 10 volts greater than the rated voltage of the accumulator.

* * * * *